(12) United States Patent
Garvey et al.

(10) Patent No.: US 6,313,910 B1
(45) Date of Patent: *Nov. 6, 2001

(54) APPARATUS FOR MEASUREMENT OF OPTICAL BEAMS

(75) Inventors: Steven E. Garvey, Boulder Creek, CA (US); Andrew D. MacGregor, Boulder, CO (US)

(73) Assignee: Dataray, Inc., Boulder Creek, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/393,680

(22) Filed: Sep. 10, 1999

Related U.S. Application Data
(60) Provisional application No. 60/099,962, filed on Sep. 11, 1998.

(51) Int. Cl.$^7$ .................................................... G01N 21/00
(52) U.S. Cl. ............................................................ 356/121
(58) Field of Search .................................. 356/121, 222, 356/6, 124; 219/121.61, 121.62; 372/92, 98, 101

(56) References Cited

U.S. PATENT DOCUMENTS 5,214,485 * 5/1993 Sasnett et al. ......................... 356/121
5,991,015 * 11/1999 Zamel et al. .......................... 356/222

* cited by examiner

*Primary Examiner*—Frank G. Font
*Assistant Examiner*—Michael P. Stafira
(74) *Attorney, Agent, or Firm*—John Smith-Hill, Smith-Hill and Bedell (57) ABSTRACT

Apparatus for real time measurement of optical beam parameters includes an assembly of known dimensions, carrying multiple apertures, occupying parallel planes. The assembly can be moved so that the apertures sequentially intersect an optical beam which is not propagated in the plane of the apertures. At least one pair of the apertures are non-circular and identical with accurately established positions and which are not disposed in the same angular alignment when they intercept the beam but are disposed in the same plane in order to allow determination of the two-dimensional position of the centroid of the beam in that plane.

40 Claims, 7 Drawing Sheets

APPARATUS FOR MEASUREMENT OF OPTICAL BEAMS

CROSS-REFERENCE TO RELATED APPLICATIONS

This application claims benefit of Provisional Application No. 60/099,962 filed Sep. 11, 1998.

1 BACKGROUND OF INVENTION

This invention relates to an apparatus for measurement of optical beams, specifically to an apparatus for the real-time measurement of optical beam intensity profile, diameter and centroid in single or multiple planes; for the measurement of beam divergence and axial angular deviation; and for the determination of the beamwaist position location, and M-squared value for focused optical beams

2 DESCRIPTION OF THE INVENTION

2.1 Problem Addressed

This invention addresses measurement of optical beams. It enables real-time measurement of optical beam parameters for comparison with specifications. Measurable beam parameters are:

a) Optical beam intensity profile, diameter and centroid. From measurement of these parameters in multiple planes separated in the beam propagation direction, the following may be derived:

b) The direction, x-y-z centroid location and diameter of a focused waist along the z-axis, derived from a fit of the beam measurements in multiple planes to standard beam propagation formulae.

c) Beam angular divergence, derived from the variation of diameter with distance along the beam propagation axis.

d) Beam angular deviation from the nominal beam axis, from the measurement apparatus axis, or from a defined axis, derived from the locus of the beam centroids.

e) Beam $M^2$ (pronounced "M-Squared"), a quality parameter for focused laser beams, derived from a fit of the beam measurements in multiple planes to standard beam propagation formulae. $M^2$ is a measure of how closely a laser beam approaches the ideal $TEM_{00}$ Gaussian propagation profile for a single-mode laser beam. Beams that are closer to the ideal may be focused to a smaller spot.

Figure 1A:
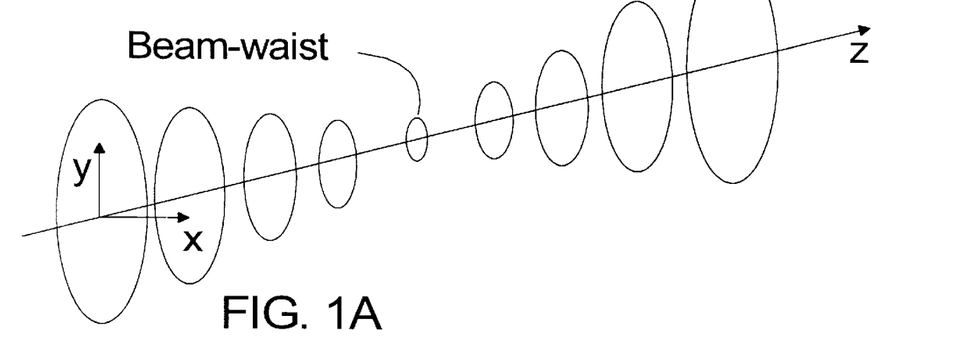
FIG. 1A is a schematic representation of an optical beam propagating in the z direction through a beamwaist region. The z direction is the locus of propagation of the beam centroid. The ellipses represent successive profiles of the beam, defined here as the contour at which the intensity if 13.5% ($1/e^2$) of the intensity.

FIG. 1a illustrates a propagating optical beam in the focus (beamwaist) region and illustrates the conventional x-y-z orthogonal axes, the z axis being the beam propagation axis. In practice, the z axis may be the actual beam propagation axis, the nominal beam propagation axis, the measurement apparatus axis, or another defined axis).

Figure 1B:
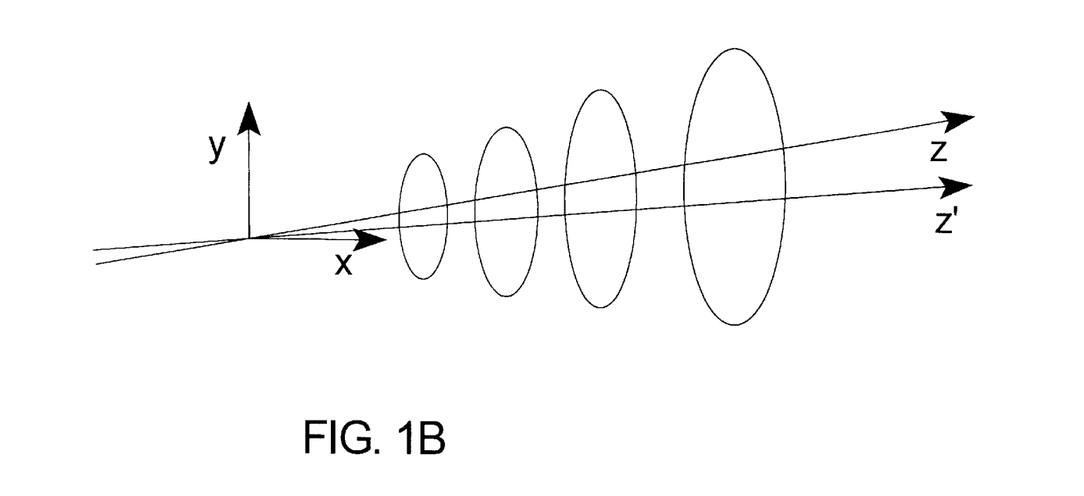
FIG. 1B is a schematic representation of an optical beam diverging in the z direction. The z direction is the propagation locus of the beam centroid. The z, axis is the axis with respect to which beam axial angular deviation is to be measured.

FIG. 1b illustrates a simple diverging beam for which the axial angular deviation and angular divergence is to be measured.

Addendum 1 addresses the definition and derivation of beam diameter, beam centroid, beam divergence and $M^2$ from measurements of beam intensity versus position.

This invention may be employed for real-time measurement and hence adjustment of coherent and incoherent optical beams. An exception is beam $M^2$ measurement, which only applies to coherent beams.

This invention comprises a generic and a specific approach which allows the measurement of the listed parameters. A specific important embodiment allows real-time operation, defined here as an update rate greater than 1 Hz. That is an update rate fast enough to allow real-time positional, angular and/or beam shape adjustment of the optical and/or fiber optic beam assemblies and instruments from which the optical beams emanate.

In the manufacture and adjustment of single or multiple optical and/or fiber optic beam assemblies that must give optical beams with specific values of parameters selected from the list above, this apparatus can assist the real-time adjustment of said assemblies to give beams of the desired specifications. If a beam cannot be adjusted to the desired specifications, then the measurement of one or more of the parameters listed above, can be an important diagnostic for correction of the problem(s).

Optical is defined here as the region of the electromagnetic spectrum between the deep UV around 10 nanometers and the far infrared around 100 microns.

Fiber optic assemblies include but are not limited to: single-mode fibers, multi-mode fibers, fiber lasers, and/or coherent or incoherent fiber bundles, and assemblies employing such fibers, which either emit or accept optical beams.

Optical assemblies include but are not limited to: coherent laser sources (Including but not limited to: single chip semiconductor lasers, gas lasers, pumped solid state lasers, any of the multiple means of generating a laser beam), incoherent sources (Including but not limited to: arc lamps, discharge lamps, filament lamps, LEDs, solid state emitters, discharge lamps, etc.), complex assemblies or instruments which optically shape the output from one or more of these sources in order to create single or multiple beams shaped and/or focused for a particular purpose.

2.2 Prior Art

2.2.1 Single Plane Measurement

A variety of measurement techniques are available that determine laser beam diameter from measurements of beam intensity versus position. An apparatus for measuring beam diameter 2W(z) in an x-y plane at position z, typically consists of either:

a) Some form of photosensitive camera onto which the beam falls. or:

b) Some form of aperture, typically a slit or knife-edge, which moves, or can be resized, orthogonal to the beam propagation axis (conventionally termed the z-axis) and is interposed between the beam and a photosensitive detector and changes the portion of the beam falling upon the photosensitive detector.

The signal output from the detector is analyzed in order to determine beam intensity profile I(x,y) versus x,y position in the plane of measurement. The beam diameter and centroid position is then determined from I(x,y). See Addendum 1 for definitions.

Figure 2A:
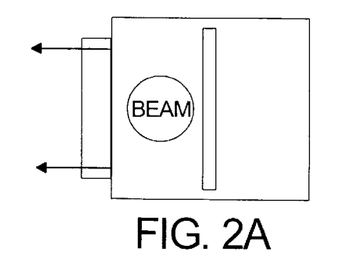
FIG. 2A illustrates a scanning technique for measurement of beam intensity profile employing a scanning slit assembly.
Figure 2B:
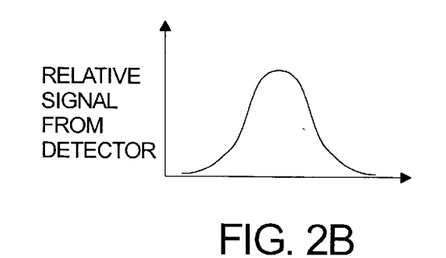
FIG. 2B is a graph illustrating relative signal from the detector in FIG. 2A as a function of aperture position.
Figure 3A:
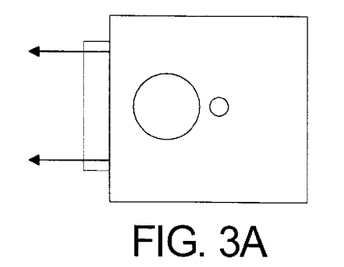
FIG. 3A illustrates a scanning technique for measurement of beam intensity profile employing a scanning pinhole assembly.
Figure 3B:
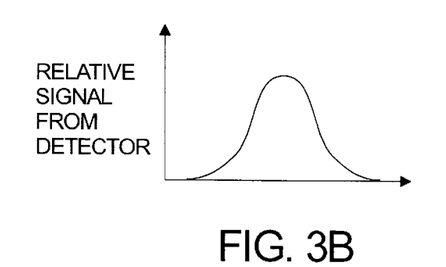
FIG. 3B is a graph illustrating relative signal from the detector in FIG. 3A as a function of aperture position.

The basic techniques employ an apertured photosensitive detector from which an electrical signal proportional to the received intensity may be derived. As outlined in the ISO 11146 standard (Ref. 1), and illustrated in FIG. 2, these are:

1) Scanning a slit or a pinhole across the profile in the x-y plane, directly measures the profile. As the slit or pinhole aperture scans across the intensity profile, the intensity transmitted through the aperture and measured by the photosensitive detector is a measure of the intensity profile in the scan direction, and is passed to processing electronics and software. The slit width should be less than ten times the beam diameter; if this is not the case mathematical deconvolution of the slit width from the measured profile, or use of an empirical correction formula based on the ratio of slit width to measured width should be employed. See, e.g., Ref. 5.

Figure 4A:
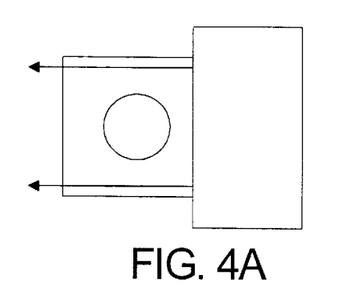
FIG. 4A illustrates a scanning knife-edge assembly for measurement of beam intensity profile employing a scanning slit assembly.
Figure 4B:
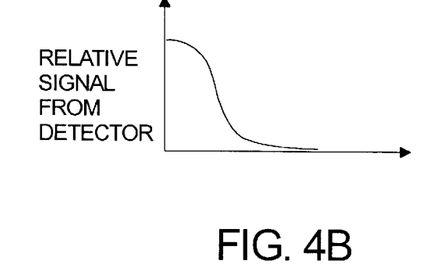
FIG. 4B is a graph illustrating relative signal from the detector in FIG. 4A as a function of aperture position.

2) Scanning a knife-edge across the profile in the x-y plane, measures the integral intensity profile. As the knife-edge aperture scans across the intensity profile, the intensity transmitted past the knife-edge and measured by the photosensitive detector is a measure of the integral of the intensity profile in the scan direction. The signal from the photosensitive detector is passed to processing electronics and software for differentiation and subsequent analysis.

It should be noted that when a high percentage of the beam profile, (preferably, but not necessarily, close to 100%), passes through a slit, then the slit can be treated as a pair of opposed knife edges and the scan profile is then the integral of the intensity profile followed by the reverse integral of the intensity profile. This approach is well-known, and may be employed in the apparatus described in this patent.

Figure 5:
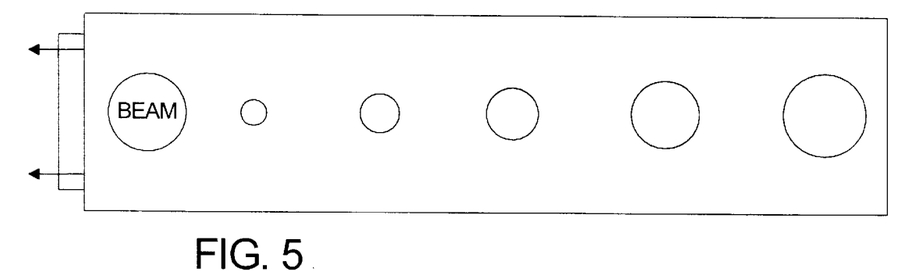
FIG. 5 illustrates a variable aperture technique for measurement of beam intensity profile employing multiple circular apertures of different diameters sequentially positioned on the beam centroid between the beam and the detector.

3) Measurement of total energy passed by a series of circular apertures of different diameters placed in the same x-y plane at the same z. The apertures are sequentially placed between the beam and the detector, each aperture being centered on the beam in a manner to maximize the transmitted signal. The total energy passing through each aperture is then a measure of the integral energy passing through that aperture diameter. The difference between the energy transmitted by sequential apertures is a measure of the differential radial intensity. The radial intensity profile may therefore be reconstructed as the differential of the measured transmitted intensity versus aperture radius. A variation on this technique employs a variable diameter iris aperture.

Figure 6A:
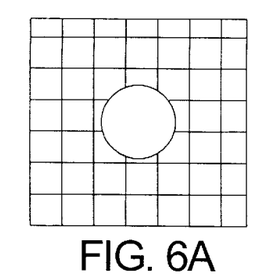
FIG. 6A illustrates a beam imaging technique for measurement of beam intensity profile, with the beam incident on a detector array.
Figure 6B:
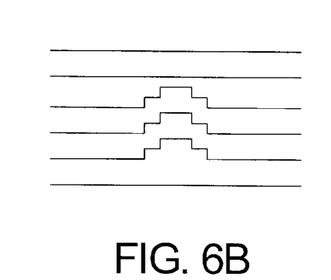
FIG. 6B illustrates the readout of the detector array shown in FIG. 6A.

4) Beam imaging onto an array of detectors in the x-y plane, e.g. a camera, each pixel or resolution element of which constitutes a staring apertured detector. The intensity measured by each pixel is a measure of the I(x,y) intensity at that position. The pixels are read out individually in a controlled ("clocked") sequence and the I(x,y) signal derived by subsequent sampling and processing electronics and software.

2.2.2 Multiple Plane Measurement

U.S. Pat. No. 3,617,755, now expired, infers technique 2) above, and specifies the generic technique of measurement in multiple planes in order to determine focal position. $M^2$ was not a defined parameter at the time this patent was issued.

The measurement of focal position, angular alignment, beam divergence and $M^2$ requires the measurement of the variation in laser beam diameter [2W(z)] and centroid, versus beam axial distance z, in the region around a focused beam waist. Conventionally this has been performed by taking an apparatus for measuring beam I(x,y), diameter and centroid, and:

a) Sequentially moving the measuring apparatus along the axis of the beam and measuring these parameters at a number of positions either side of the waist. For example, the Gentec LBQM.

b) Alternatively, the measuring apparatus may be fixed and the beam waist region is moved through the plane of measurement of the apparatus. This may be accomplished either by:

i) Moving the laser assembly that generates the focused beam along the beam axis. or:

ii) Re-imaging the primary waist to a secondary waist using an optical element, (Addendum 1, Figure A3) and then moving the optical element or the measuring apparatus along the beam axis such that the secondary waist moves through the plane of measurement. For example: the DataRay M2B Beamscope™ Accessory, the Duma Optronics $M^2$ Meter, the Coherent ModeMaster™ [P4].

This moving optical element approach is normally not appropriate to the measurement of laser beams which are already focused, since the introduction of an additional optical element changes the focused beam diameter and divergence. In consequence, these parameters could only be calculated for the original beam, rather than measured directly. An alternative approach is required for such focused beams. ($M^2$ itself remains unchanged if a totally aberration-free optical element is used.) In addition, the requirement to move a lens or a measuring apparatus in z frequently precludes real-time (>1 Hz) measurement.

c) Alternatively, an optical system may be devised using multiple partial reflectors set at appropriate distances around the region of the beam-waist. The resulting slices through the beam profile are then measured using a beam profiler. For example: the Sensor Physics M2-OPT Attachment, which reflects multiple beam slices onto a camera.

d) Alternatively, if the original beam-waist location is known and if the diameter $2W_0$ is measured, the beam far-field divergence $\Theta$ radians may be measured by interposing a lens in the beam and measuring the beam diameter at the back focal distance of the lens. $M^2$ can be calculated from these values using equation 3) of Addendum 4. For example: the Gentec LBQM, the DataRay WinCam in Special Planar $M^2$ mode.

3. THIS INVENTION

The novel aspect of this invention is a apparatus that allows multiple apertures to sequentially measure the beam diameter at single or multiple planes along the beam axis, without a requirement to move the measurement apparatus in z.

Measuring in multiple planes in the region around the focused waist, allows determination of the focus direction and an estimate of the focus position and diameter, plus measurement of beam divergence and angular deviation, without any requirement to move the apparatus generating the laser beam or the apparatus measuring the beam diameter, along the z-axis. The addition of motion does allow more exact determination of the focus position.

The apertures could be pinholes, slits, knife-edges, or any aperture with a shape that can be mathematically, electronically and/or optically deconvolved in order to give some beam intensity versus position measurement useful in measuring a beam parameter of interest.

3.2 DETAILED DESCRIPTION

Figures 7A, 7B:
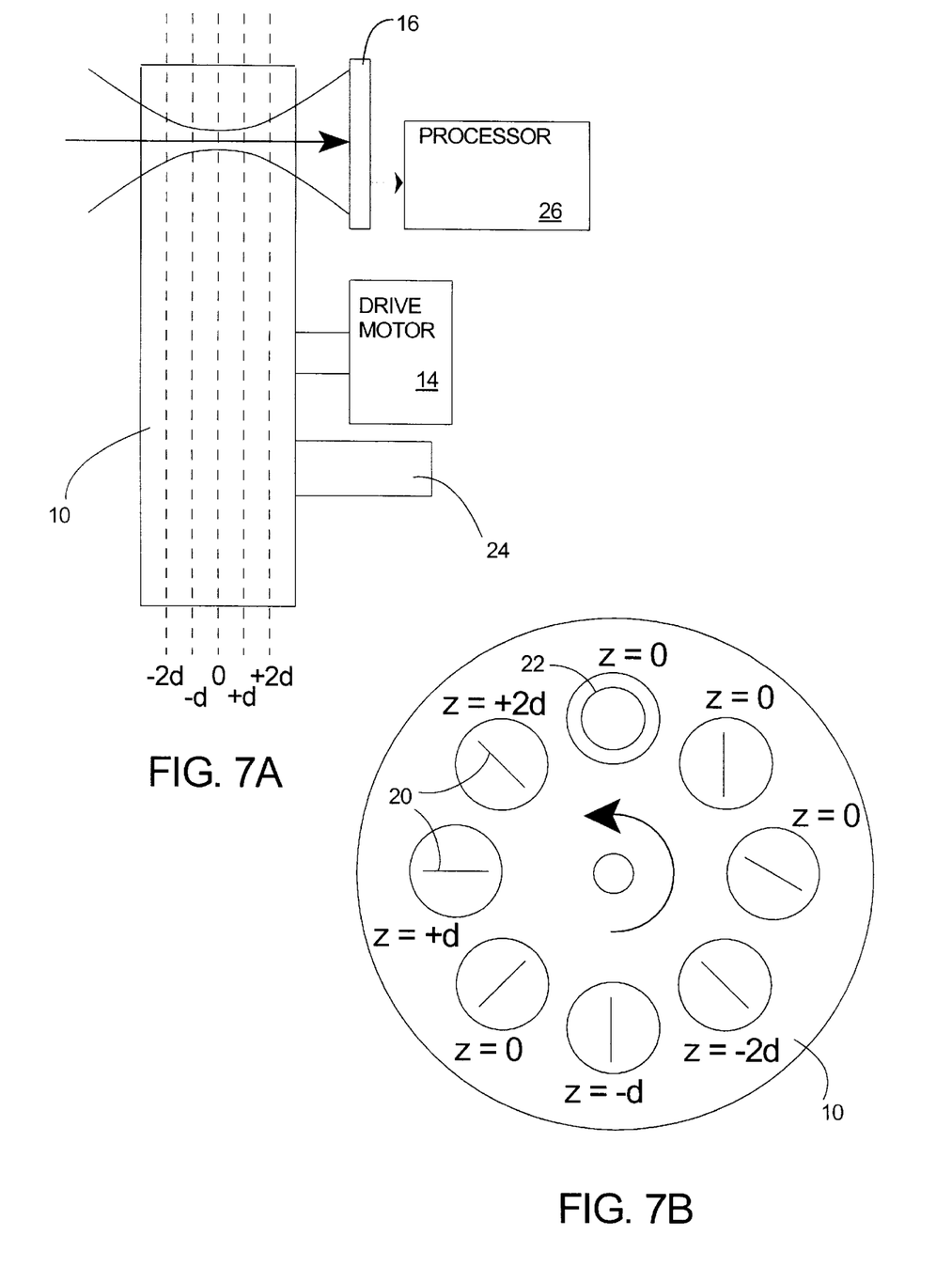
FIG. 7A is a side elevation of a first measurement apparatus in accordance with the present invention.
FIG. 7B is an end elevation of the apparatus shown in FIG. 7A, illustrating the orientation of the apertures and the positions of the apertures with respect to the z=0 plane.

In a specific measuring apparatus embodiment example, illustrated in FIGS. 7A and 7B, the assembly comprises a disk or puck 10. The puck 10 is formed with multiple apertures which are angularly distributed at 45° about the axis of the puck and are at the same radius but at different distances along the z axis. FIG. 7A shows the location along the z axis of a reference plane (z=0) and the locations of other planes at z=±d and z=±2d. The puck 10 is mounted to rotate about an axis, which is normally close to parallel to the nominal beam axis, and is driven by a motor 14. FIG. 7A illustrates a propagating optical beam directed toward a photosensitive detector 16 which is connected to processing electronics. FIG. 7A also illustrates schematically the 2W(z) vs. z beam profile 18 in the waist region of the propagating beam. As shown in FIG. 7B, the eight apertures are seven slits 20 and a single circular aperture 22. The z position of each aperture is shown in FIG. 7B. The angular position of the puck 10 is measured by a puck position pick-up 24.

Figure 8:
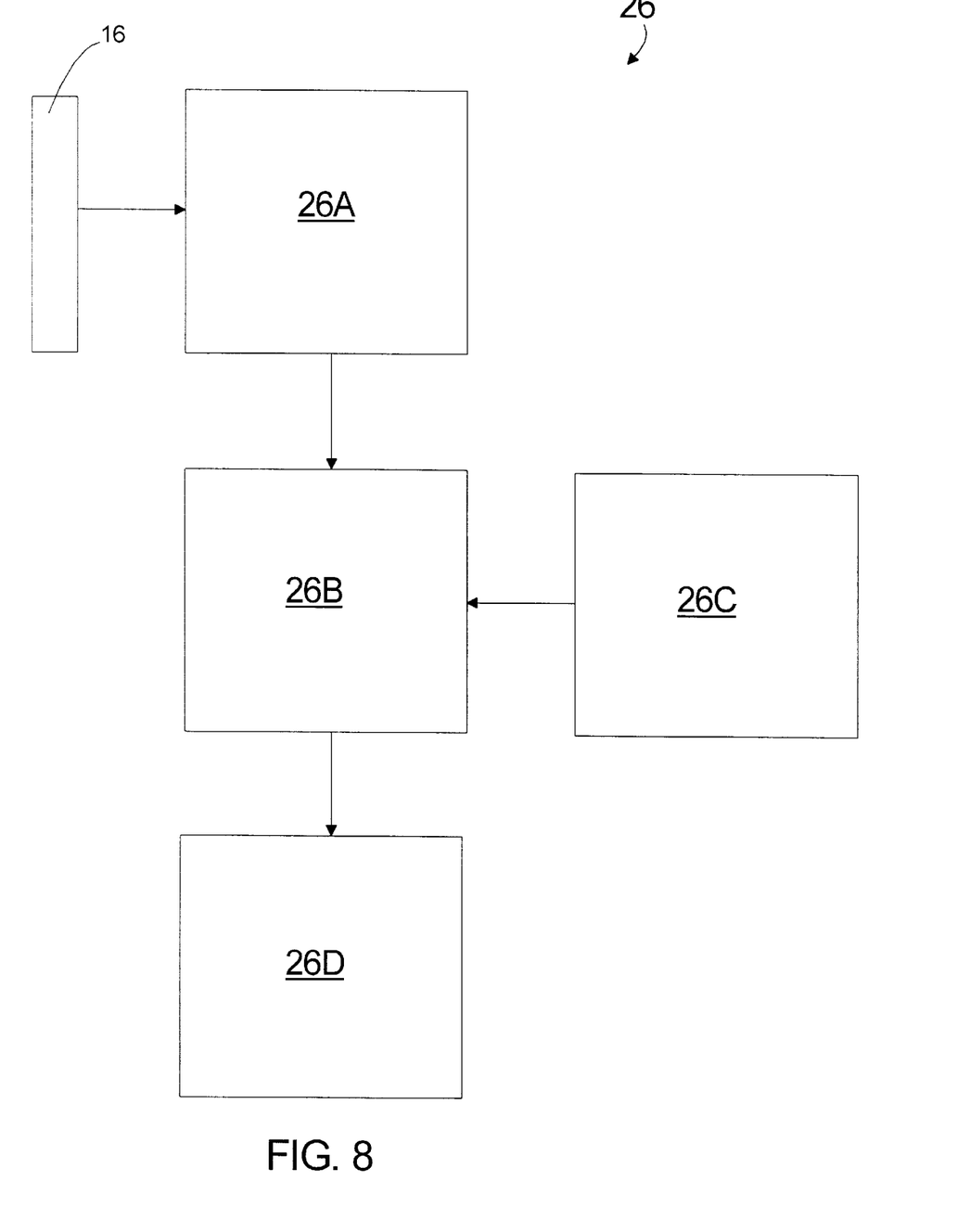
FIG. 8 is a flow chart illustrating the signal processing of the output signal provided by the photosensitive detector.

Light passing through the apertures falls onto the photosensitive detector 16, which has active area dimensions larger than the beam dimensions. The electrical signal from the detector is passed to a processor 26 for subsequent signal amplification, conditioning and sampling electronics, and is then digitized for analysis and display by appropriate software. The typical signal processing flow is illustrated in greater detail in FIG. 8. The first stage processing 26A typically includes linear or logarithmic variable gain amplification. The second stage processing 26B typically consists of analog to digital conversion and digital signal processing directed by software (26C). The software program 26C controls the digital processing in order to derive the required measurement data from the digitized raw data. The processed data is displayed and formatted for delivery to other processors and/or motion controllers, as shown at 26D. Audio or visual outputs may be provided.

As illustrated in FIG. 7A, the z-axis is horizontal on the page, the x-axis is orthogonal to the page, and the y-axis is vertical on the page. The origin of the axes is the center of the apertures in the z=0 plane when they are positioned at the 12 o'clock position. As the puck 10 rotates, each aperture performs a (close to) linear scan in x across the twelve o'clock region, and transmitted intensity data is sampled during this period.

Shown going clockwise from the top in FIG. 7B, the eight apertures comprise:

a) A circular aperture 22 of sufficient diameter to allow passage of the whole beam in order to measure the full power of the beam.

b) Two slits in the z=0 reference plane of the apparatus, set at ±45° to the local radius on the disk. The relative timing of the centroid positions of the intensity profiles measured by these two slits, allows determination of the radial position of the centroid of the beam in this plane. For the slits as shown, a beam at high radius will show a larger centroid timing separation than a beam at a smaller radius. Since the linear scan rate across a beam is proportional to its radial distance from the center of rotation, it is necessary to find this radial distance in order to calibrate the apparatus for beam radial position.

c) Five slits at +2d, +d, 0, −d, −2d from the z=0 reference plane, each slit set parallel to the local radial direction on the disk. These apertures measure the beam intensity profile at five different values of z about the beamwaist. These slits scan the profile along one axis only, this being defined here as the x-axis, x=0 being when any individual slit is aligned along the y-axis at the twelve o'clock position.

As these slits rotate they change angle with respect to the x-axis. For a slit centered at radius R on the puck, the tilt angle of the slit from the y-axis may be calculated to be arcsin(d/R), where d is the distance of the center of the slit from the x=0 position. For d/R=0.1, arcsin(d/R)=5.73°, which is (arbitrarily) considered an upper limit for being acceptably close to alignment with the y-axis.

For focused beams, typically <100 microns in diameter, for R=12 mm, arcsin(d/R) <0.24°, which is so small as to make no significant difference to the measured profiles.

The relative x-y-z positions of the ends of each slit are accurately measured during apparatus calibration and saved as a puck calibration file. This file may be used by the software to correct measured profiles for incorrect slit position compared with the ideal. Use of such a calibration alleviates the requirement to position the slits perfectly on the puck.

The drive motor 14 is a micro-step driven multi-phase stepper motor which rotates the puck about a precision axis. Stepper motor damping is employed to reduce rotational jitter (variations in rotational speed as a function of rotational position), such that inaccuracies in the rotation of the disk do not limit the required precision of the measurement. Rotational jitter damping may be inertial, viscous, electronic, magnetic or some combination of two or more of these. See e.g. Ref. 3.

Specifically:
a) The speed of rotation of the puck must be constant to a level that allows the puck angular position sensor, however implemented, to accurately represent the puck angular position between position readouts. For example, if the position is read out 1000 times per revolution and a resolution along the x-axis of resolution of 1 part in $10^6$ per revolution is required, then the puck rotation speed must be constant to 1 part in $10^3$ between the individual angular position readouts.

b) The speed of rotation is preferably constant to a second level such that a single reference per revolution in conjunction with a stable clock pulse train can adequately define the disk position at which each optical power sample is taken from the detector(s). This stability is defined as required spatial resolution divided by $2\pi r$, where r is the radius at which the beam axis hits the disk. E.g. 0.1 μm resolution at r=16 mm [$2\pi r$=100 mm] requires a stability of 1 part in $10^6$ or 0.0001%.

c) The 'flutter' in the disk, i.e. the rotation to rotation difference in the along axis positions of the slits must be below that which would cause unacceptable levels of error in the assumed (and measured during set-up) slit axial position. The acceptable tolerance here varies from system to system and beam to beam but may be calculated for any given beam and slit separation along the z-axis. Precision bearings on the motor shaft can reduce flutter to acceptable levels.

Damped motors can be difficult to start, therefore the electronics/software combination detects when the motor has either not started or has not achieved the desired speed following a start instruction. In such cases, it can instruct the motor drive to use voltages and/or currents that exceed the values employed during normal running, and to attempt restarts as necessary.

The puck position pick-up 24 measures the rotational angular position (theta) of the puck and could be a precisely centered rotational position encoder, but for many envisaged applications the required positional referencing is of the order of 1 part in $10^6$, making a rotational encoder an expensive component.

For the embodiment described here, theta readout with adequate resolution is achieved as follows:

a) An opto-interrupter produces a reference pulse once per rotation as (e.g.) an opaque "blade" attached to the rotating puck interrupts the optical path between an LED and a photosensitive detector. (The photosensitive detector that detects optical beams passing through the aperture on the puck must be optically shielded from the LED.) A magnetic sensor could also be employed with a small magnet attached to the puck.

b) A master clock generates a stable clock pulse at a suitably high rate, at least equal to the product of the required rotational position resolution and the puck rotation frequency. This master clock also provides the timing reference to the multi-phase stepper motor micro-stepping drive electronics.

c) The motor drive electronics output a reference pulse for every cardinal step of the motor, defined as the positive going zero crossing of the micro-step drive sinusoid. (100 cardinal steps per revolution in this example).

d) A 'revolution start pulse' is generated from the master clock pulse train once per revolution, the start pulse timing being set by the first cardinal step reference pulse following the opto-interrupter reference pulse.

e) The master clock is counted each revolution from the revolution start pulse to the next start pulse. The clock count is a direct indication of rotational position.

For the case of measurement of focused laser beams, the dynamic range required of the detector may be reduced by employing slits (or generically 'apertures'), in planes other than the z=0 plane of the puck, that are wider than the slit (or aperture) in the z=0 plane. This ensures that a more similar percentage of the total energy in the beam is transmitted to the photosensitive detector by each aperture.

As each aperture scans the beam region at twelve o'clock, the measured signal from the photosensitive detector is amplified employing a stepped gain amplifier. The gain is set individually for each aperture scanned past the detector, using the gain determined from the peak intensity measured on that aperture during the previous rotation of the puck. Use of stepped gain rather than a constant gain minimizes the dynamic range requirement on the next stage ADC (Analog-to-Digital Converter).

The signal from the stepped gain amplifier is then sent to an Analog-to-Digital Converter. The ADC sampling clock is referenced from the master clock noted above.

The digital signal from the ADC is interpreted by further digital electronics and/or software and reduced to I(x,y), 2W(z) and centroid measurements.

In order to establish the value of $M^2$ and the x-y-z position and size of the beamwaist, the 2W(z) versus z measurements are fitted to the $M^2$ curve described in Addendum 1, equations A7) through A9).

The measurement of beam centroid versus z for the five slits allows determination of the angle of the beam axis with respect to the axis of rotation of the disk. In the example shown, with all slits outside the z=0 plane being radial and therefore scanning along the x axis only, only the angular deviation in the x-z plane can be measured. To measure in the orthogonal y plane, the apparatus must be rotated by 90°. This may be accomplished by mounting the apparatus on an axis that rotates around the beam input axis (the twelve o'clock position). Optionally the angular position of the head may be read out to the software employing an angular encoder and appropriate processing electronics.

Figure 9:
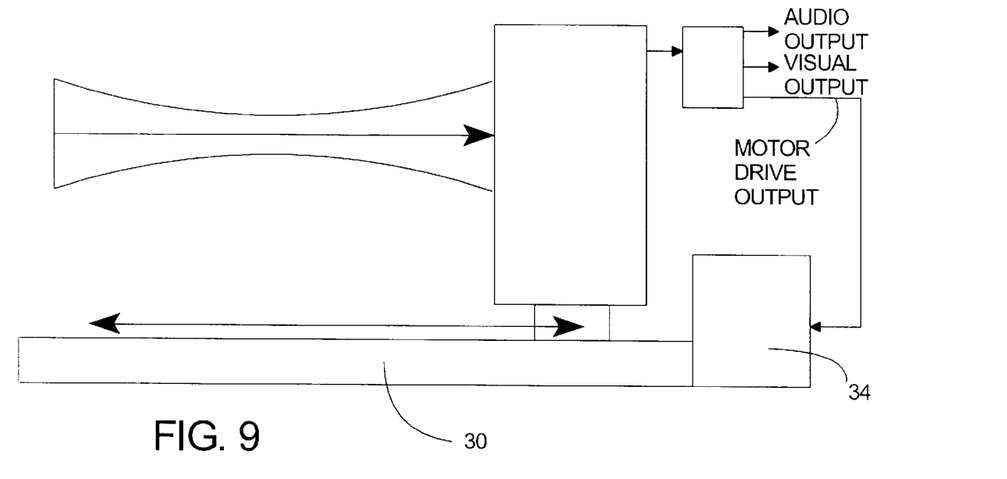
FIG. 9 illustrates the measurement apparatus and enhancements which facilitate moving the z=0 plane to the beam focus for more accurate determination of focus position and waist diameter.

Referring to FIG. 9, in order to improve the focus measurement accuracy, the apparatus shown in FIGS. 7A and 7B may be mounted on a linear travel stage 30 parallel or close to parallel to the z-axis, and moved to a position such that the central slit (z=0 in the preferred embodiment) is located at the focus. Data processing may be employed to derive a 'focus parameter,' which either maximizes or minimizes as the apparatus moves into this preferred position. Either audible (changing frequency and/or volume) or visual indication (color, intensity, modulation frequency, and or symbol shape) of the focus parameter may be employed to facilitate manual adjustment of the apparatus to this preferred position.

In some cases, the motion of the apparatus along the z-axis to the focus may be automatically driven by a motor 34 in response to a motion signal derived from the focus parameter. FIG. 9.

In other cases, the motion signal derived from the focus parameter may automatically adjust the beam assembly to the correct focus.

In an embodiment for measurement of simple beam profile, centroid and diameter in a particular plane, all slits, knife-edges or other apertures would lie in the same plane.

In an embodiment for measurement of beam diameters in a particular plane but over multiple diameters on the same beam, the non-circular apertures (preferably slit or knife edge) would be disposed at differing angles to the radial direction.

In order to reconstruct an 'image' of the beam, such multiple angle I(x,y) measurements can provide inputs to optical tomographic reconstruction processing techniques such as Fourier inversion, Filtered backprojection, or Algebraic reconstruction, by which suitable software generates a reconstructed 'image' of the beam. (e.g. Ref. 4)

Figures 10A, 10B:
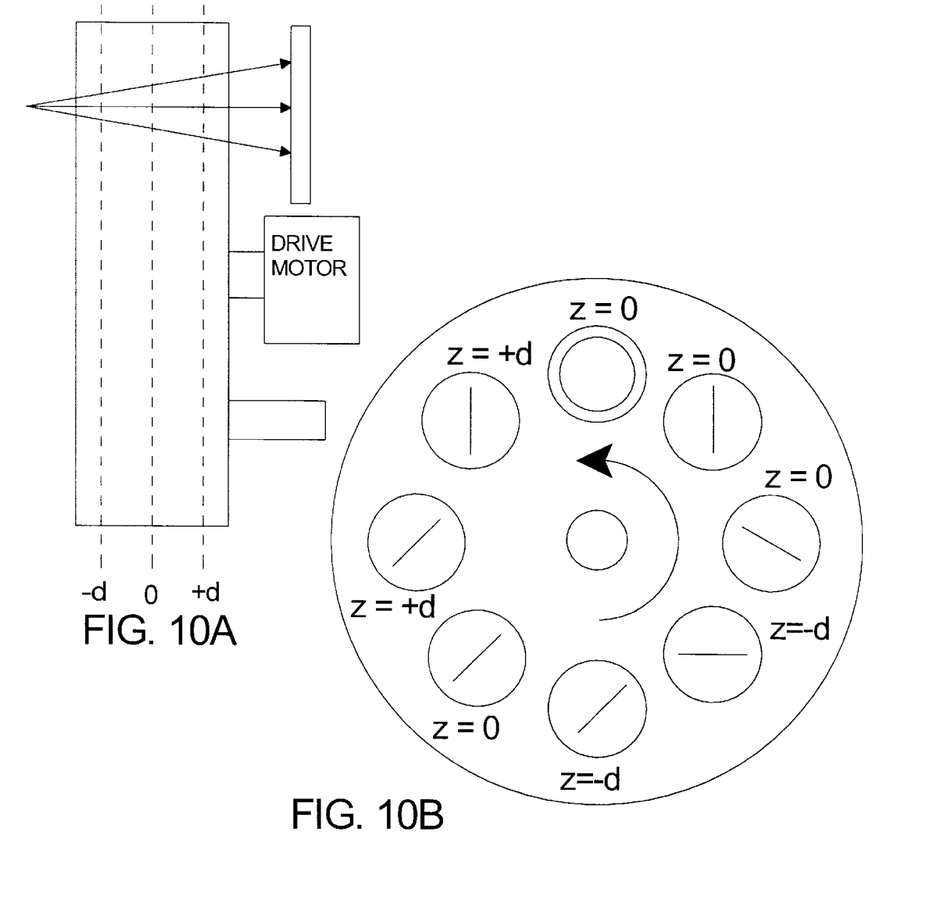
FIG. 10A is a side elevation of a second measurement apparatus in accordance with the present invention.
FIG. 10B is an end elevation of the apparatus shown in FIG. 10A illustrating the orientation of the slit apertures and the positions of the apertures with respect to the z=0 plane.

In an embodiment for measurement of beam divergence, different planes contain pairs of precisely located slits, knife edges or other appropriate apertures, set orthogonal to one another and at ±45° to the scan direction. This allows determination of beam centroid and X and Y profiles in each plane, and hence beam divergence. FIGS. 10A and 10B show an embodiment with three planes of measurement.

4. ALTERNATIVE EMBODIMENTS

Figure 11:
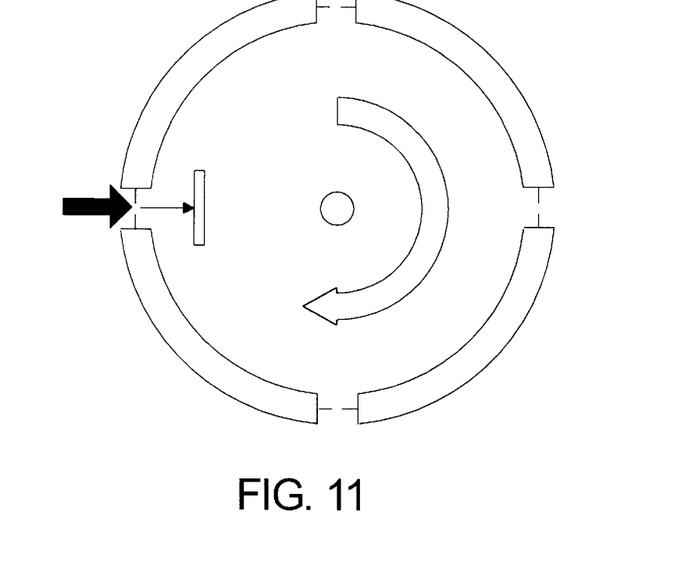
FIG. 11 illustrates schematically a third measurement apparatus in accordance with the invention, employing a rotating drum with slit apertures at different radial distances from the rotation axis.
Figure 12:
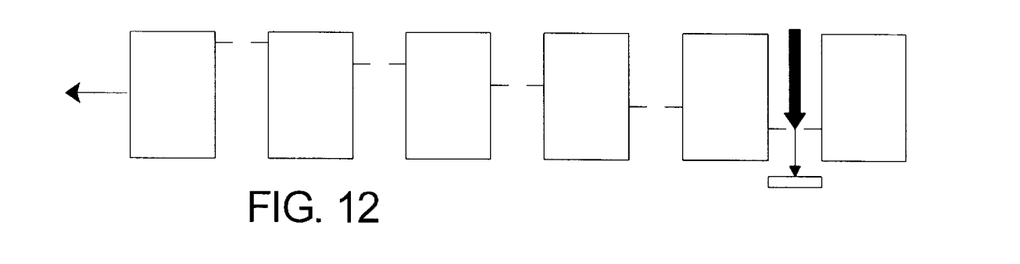
FIG. 12 illustrates a fourth measurement apparatus in accordance with the invention employing multiple apertures on a scanning linear slide, with the apertures at different planes in z.
Figure 13:
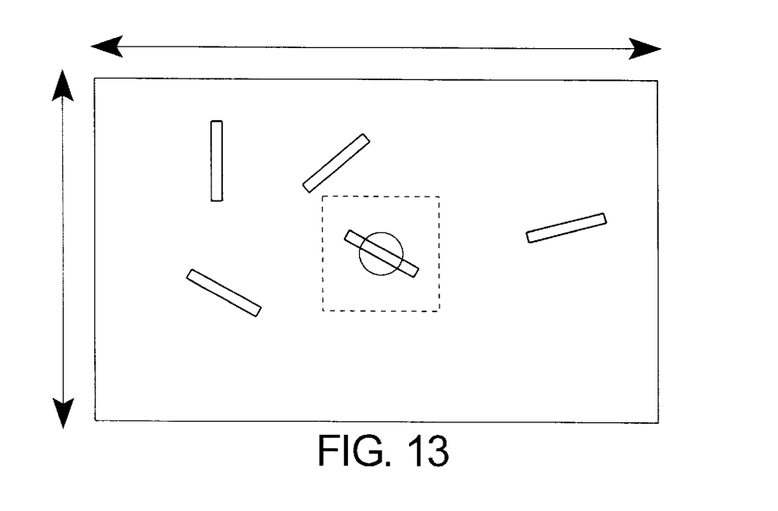
FIG. 13 illustrates a plate containing a plurality of apertures (e.g. slits as shown) distributed at a plurality of angles. The plate can be moved with precision to any position in x or y. A modification would allow the plate to also move in z and/or rotate in the x-y plane, in order to use a lesser number of apertures to characterize the beam at multiple planes in z.

Alternative embodiments might include the use of apertures, preferably slits or knife-edges, separated in the z (beam axis) direction, and mounted:

a) On a rotating drum, with the plane of the apertures at right angles to the z-axis, whatever the chosen orientation of the drum axis. A preferred drum rotation axis orientation would be at right angles to the z-axis. The incident beam is directed towards the detector, which is located inside the drum and is connected to the processing electronics See FIG. 11. (U.S. Pat. Nos. 5,267,012, 5,214,485, 5,100,231 and 5,064,284 described a rotating drum with a moving lens forming a waist in order to measure $M^2$ of low divergence lasers. Measurements are taken one or more times per rotation as the measuring aperture(s) crosses the z axis, measuring both when the aperture is closer to the lens than the drums axis of rotation, and further from the lens than the axis of rotation. However the apertures are all at the same radius on the drum.)

b) On a linear motion arm, with the plane of the apertures at right angles to the z-axis, whatever the chosen orientation of the arm motion. A preferred arm motion axis orientation would be in an x-y plane at right angles to the z-axis. FIG. 12.

c) On any mechanism, which allowed scanning apertures to be sequentially placed at different positions in z. The preferred aperture orientation is at right angles to the z-axis, although other aperture orientations may be appropriate. FIG. 13. The plate shown in FIG. 13 can be moved to any position to any position in x or y along the illustrated scan axes.

5. REFERENCES

1. ISO 11146. "Optics and Optical Apparatus. Lasers and Laser Related Equipment. Test Methods for Beam Widths, Divergence Angle and Beam Propagation Factor." Published by the International Organization for Standardization.
2. T. F. Johnston Jr., "Beam Propagation ($M^2$) Measurement Made as Easy as it Gets: The Four-cuts Method", Applied Optics, Vol. 37, No. 21, Jul. 20, 1998, pp. 4840–4850.
3. T. Kenjo and A. Sugawara. "Stepping Motors and Their Microprocessor Controls.", Oxford University Press, 1994. Chapter 9. Damping Methods of Step Motors, B. C. Kuo and G. Singh.
4. R. A. Williams and M. S. Beck, "Process Tomography, Principles, Techniques and Applications", 1995, Butterworth-Heinmann Ltd. E.g. Chapter 10, The development of optical systems for process imaging, Section 10.3 Reconstruction algorithms.
5. J. M. Fleischer and S. M. Curry, "Slit Width and How it Warps Beam Profile Measurements" Lasers and Applications, October, 1991.

ADDENDUM 1: Optical Beam Diameter, Waist, Centroid and M-squared Definitions

A1. Beamwidth Definition

A1.1 Gaussian Beams

True Gaussian beams have no 'edges'; that is, the intensity of a perfect Gaussian never actually falls to zero at large distances from the center. This arises from the nature of the (circularly symmetric) Gaussian intensity profile:

$$I(r) = I_0 \cdot e^{-2r^2/w^2} = \frac{2P}{\pi w^2} \cdot e^{-2r^2/w^2} \qquad \text{A1)}$$

Figure 14:
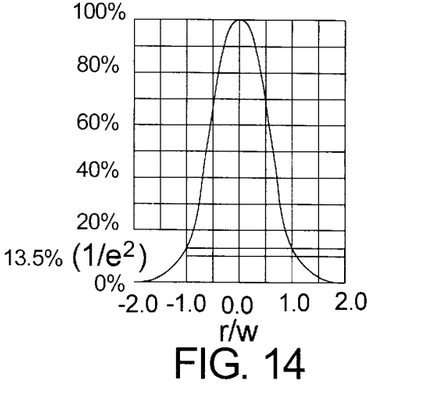
FIG. 14 shows the Gaussian profile of a $TEM_{00}$ laser beam.

Where:
r is the radius
w is the radius at the point at which the intensity has fallen to 13.5% ($1/e^2$) of the peak value ($1/e^2$)
P is the total power in the beam
FIG. 14 illustrates a one-dimensional Gaussian profile.

Replace $r^2$ by ($x^2+y^2$) and consider the profile at constant x and varying y. It is apparent that the shape of the profile is Gaussian wherever a cut is taken across the profile. It is this principle which allows slits and knife-edges to be employed in the measurement of beams which are close to Gaussian.

A1.2 Beam Irradiance

In order to assess whether the irradiance (W/mm$^2$) from a given laser might overload a beam profiler, it is useful to be able to calculate the peak irradiance. From equation A1), the on-axis irradiance at r=0 is given by:

$$I(0) = (2P/\pi w^2)^2$$
$$= 2.6P/(2w)^2 W/mm^2 \text{ for diameter } 2w \text{ in mm.}$$

For example:
The peak irradiance from a 1 mm diameter, 10 mW HeNe is 26 mW/mm$^2$.

The peak irradiance from a 5 mm diameter, 5 W NdYag is 520 mW/mm$^2$.

A1.3 Second Moment Beam Diameter

Conventionally most beams are partially or significantly non-Gaussian, and beam diameters have been measured at the $1/e^2$ intensity point; i.e. at 13.5% of the maximum intensity. ISO 11146 mandates the use of a 'Second Moment' definition of beam diameter:

$$2W_\sigma(z) = 2\sqrt{2}.\sigma(z) \quad \text{A2)}$$

where the variance, $\sigma^2(z)$, is calculated as:

$$\sigma^2(z) = \frac{\int\int r^2 \cdot I(r, \phi, z) \cdot r \cdot dr \cdot d\phi}{\int\int I(r, \phi, z) \cdot r \cdot dr \cdot d\phi} \quad \text{A3)}$$

Where $I(r,\phi,z)$ is the radial intensity distribution versus angular position $\phi$, along propagation axis z.

In more useful x and y terms, (since these are what actually get measured):

$$\sigma_x^2(z) = \frac{\int\int (x - \bar{x})^2 \cdot I(x, y, z) \cdot dx \cdot dy}{\int\int I(x, y, z) \cdot dx \cdot dy}$$

$$\sigma_y^2(z) = \frac{\int\int (y - \bar{y})^2 \cdot I(x, y, z) \cdot dx \cdot dy}{\int\int I(x, y, z) \cdot dx \cdot dy}$$

$$2W_{\sigma x}(z) = 4.\sigma_x(z)$$

$$2W_{\sigma y}(z) = 4.\sigma_y(z) \quad \text{A4)}$$

$\overline{x,y}$ denotes the centroid of the $I(x,y,z)$ intensity distribution.

(The ISO 11146 standard actually terms the quantities $E(x,y,z)$ rather than $I(x,y,z)$, and $d_{\sigma x}(z)$ and $d_{\sigma y}(z)$ rather than $2W_{\sigma x}(z)$ and $2W_{\sigma y}(z)$. Here we have used the more familiar terminology rather than the less common terminology used in the ISO standard.)

For a pure Gaussian intensity distribution, the second moment width is identical to the more familiar $1/e^2$ (13.5% of peak intensity) width.

There are a number of potential disadvantages to the use of second moment as a beam diameter definition, none of which are insurmountable in a well-designed system.

a) Unless the results are gathered and processed automatically, the second moment diameter is non-trivial to calculate. It is not possible to simply 'measure' it directly from a graphical plot of the data.

b) Any unsubtracted background in the wings, either purely analog noise or quantization noise due to inadequate dynamic range in the sensor or the ADC (analog to digital converter) leads to errors in the second moment. In general it leads to an over-estimation of the second moment width.

c) If the $I(x,y,z)$ intensity profile has wings which fall at a rate slower than $1/x^2$ or $1/y^2$, then the double integral actually increases as x and y increase.

For reasons b) and c) most commercial second moment beam diameter software first automatically determines and subtracts the background, and then truncates $I(x,y,z)$ to the zeroed background level at a predetermined multiple of the $1/e^2$ diameter. Some software allows the user to override this distance.

A2. M-Squared

There are several possible reasons for wanting to understand M-squared ($M^2$) and wanting to measure its value for a laser system:

It is the QA delivery or acceptance criterion on a laser or laser system.

Attempting to understand why a 'focused' laser spot diameter is larger than calculation predicted.

It is necessary to measure $M^2$.

It is necessary to understand the ISO 11146 standard Ref.A1.

Because $M^2$ is an invariant property of a laser beam propagating through an optical system. $M^2$ may therefore be used to describe the beam at any point in that optical system. (The optical system must neither aberrate nor truncate the beam.)

Whichever reasons apply, if to ensure that measurements are valid, it is useful, even necessary, to understand what is being measured and the limitations of the technique. This part of the addendum addresses:

The concept of $M^2$ $M^2$ formulae and how it is measured

Useful 'Rules of Thumb' and 'Sanity Checks'

A3.1 $M^2$ Definition & Formulations $M^2$ is a dimensionless parameter that characterizes the degree of imperfection of a real-world laser beam. The lower the value of $M^2$, (i.e. the closer the beam is to diffraction-limited TEM$_{00}$ perfection), the more tightly the beam can be focussed to a small spot.

Figure 15:
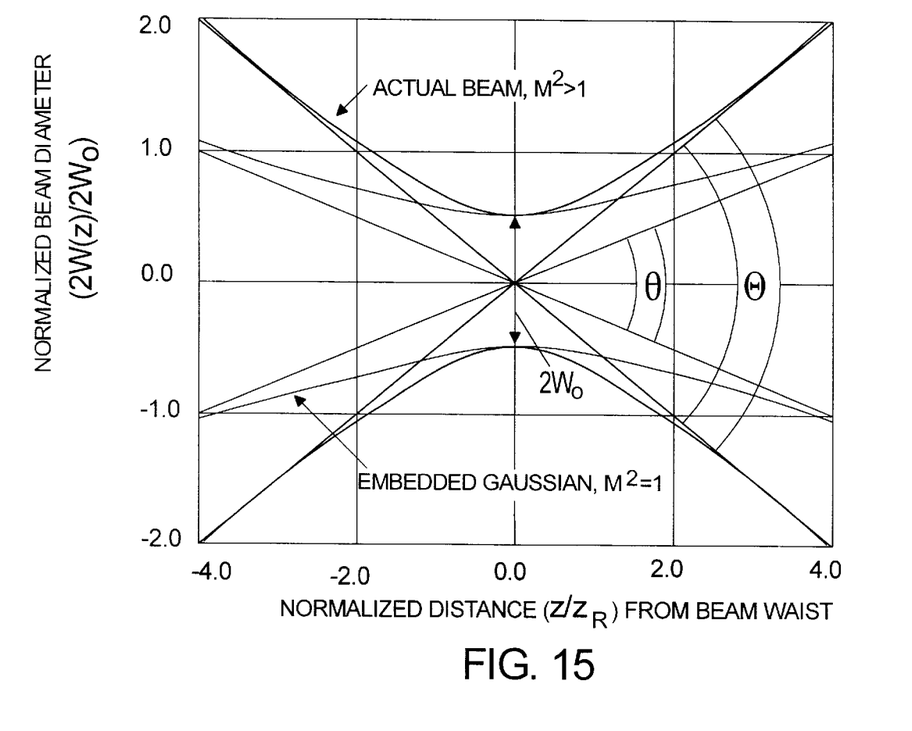
FIG. 15 is a graph illustrating the embedded Gaussian $M^2$ concept.

No laser beams are 'perfect'. Due to limitations of the optical cavity, the lasing medium, and/or the output/ancillary optics, most beams are not the 'perfect', diffraction-limited, Gaussian profile, pure TEM$_{00}$ mode described in textbooks. Complex beams can contain multiple TEM$_{xy}$ mode contributions leading to high values of $M^2$. Even a good laboratory HeNe laser has an $M^2$ of around 1.1 to 1.2, rather than the 1.0 of a 'perfect' TEM$_{00}$ beam. At its simplest $M^2$ may defined as: The ratio of the divergence of the actual beam, to that of a theoretical, diffraction-limited beam with the same waist diameter. A prerequisite of M-Squared measurement is the availability or creation of an accessible beamwaist. Referring to FIG. 15.

$$M^2 = \frac{\Theta}{\theta} \quad \text{A5)}$$

Where:

$\Theta$=The measured, far-field, full-angle divergence of the actual beam $\theta$=The theoretical far-field divergence of a 'perfect' TEM$_{00}$ Gaussian beam which has the same waist diameter as the measured beam.

And Since:

$$\theta = \frac{2\lambda}{\pi W_0} \quad \text{A6)}$$

Where:

$2W_0$=The beam waist diameter. (The measured beam waist diameter must be the second moment definition of beam diameter—see Section A1.3)

Substituting A6) into A5)

$$M^2 = \left(\frac{\pi}{4\lambda}\right) \cdot \Theta \cdot 2W_0 \text{ gives:} \qquad A7)$$

The shape of the $M^2$ curve may be shown to be hyperbolic of the form:

$$2W(z) = 2W_0 \sqrt{1 + \left(\frac{z}{z_R}\right)^2} \qquad A8)$$

Where $z_R$ is the Rayleigh Range, which is defined as the distance at which the beam diameter is $\sqrt{2}$ greater than the diameter at the waist. $z_R$ may be shown to be:

$$z_R = \frac{2W_0}{\Theta} = \frac{\pi W_0^2}{M^2 \cdot \lambda} \qquad A9)$$

Rearrangement of equations A7) to A8) gives a redefinition of $M^2$ in terms of a measured diameter at distance z from the beam waist:

$$M^2 = \frac{\pi W_0^2}{\lambda \cdot z} \cdot \sqrt{\left(\frac{2W(z)}{2W_0}\right)^2 - 1} \qquad A10)$$

Therefore any system that claims to measure $M^2$ must adequately measure the waist diameter 2W(z) versus z over an appropriate range of z.

It is important to understand that, at any given wavelength, a given value of $M^2$ does not define a single curve. From equation A7) it is apparent that a single value of $M^2$ defines a family of curves with a constant $\Theta \cdot 2W_0$ product.

To Reiterate this Point

Curves with identical divergence $\Theta$, or with identical beamwaist $2W_0$, do not necessarily have identical $M^2$ values. Curves with identical $M^2$ do not necessarily have identical divergence or identical beamwaist diameter.

It is necessary to measure both $\Theta$ (i.e. 2W(z) versus z) and $2W_0$ in order to determine $M^2$.

A3.2 Asymmetric & Astigmatic Beams

So far this addendum has assumed circularly symmetric beams; the shapes are identical in X and Y. Real beams are frequently asymmetric and astigmatic.

That is:
  a) The beams may be purely asymmetric, having the same waist positions $z_{0X}=z_{0Y}$, but different waist diameters, $2W_{0X} \neq 2W_{0Y}$ or
  b) The beams may be purely astigmatic, having different waist positions, $z_{0X} \neq z_{0Y}$, but with $2W_{0X}=2W_{0Y}$ or
  c) The beams may be asymmetric and astigmatic having different waist positions, $z_{0X} \neq z_{0Y}$, and different widths, $2W_{0X} \neq 2W_{0Y}$ or
  d) The beams may exhibit neither astigmatism nor asymmetry at the beamwaist, but may have asymmetric divergence, $\Theta_{0X} \neq \Theta_{0Y}$ Condition a), b), c) or d), or any combination thereof, leads to $M_X^2 \neq M_Y^2$. Any attempt to measure $M^2$ must realistically assume c) until the measurements prove otherwise.

Although the rest of this addendum assumes circular symmetry and a single dimension, the reader should always bear in mind that both X and Y measurements should be taken in order to characterize the beam accurately and adequately.

A3.3 The ISO 11146 Standard

The ISO 11146 standard (See Ref. A1), discusses both beamwidth measurement and $M^2$ measurement in more technical detail than is covered here. Importantly it defines that:

Second Moment rather than Gaussian equivalent diameter must be used when establishing 2W(z) versus z. The second moment diameter is specified because only the product ($M^2$) of divergence and waist diameter measured in this manner is conserved for a generalized non-Gaussian beam. (A mixture of $TEM_{xy}$ modes). (And this product is only conserved in an optical system which does not truncate the beam.) The Gaussian equivalent beam diameter is only appropriate for a $TEM_{00}$ laser beam.

Any slit, pinhole or knife-edge scanner must scan the beam in a plane at right angles to the z-axis. Rotating drum scanners with slits or knife-edges in tangential planes around the circumference scan in a circular trajectory rather than a plane. Not an issue for CCD camera based systems.

Each measurement of 2W(z) should be made five times and averaged.

For slit based measurements in accordance with the Standard, the slit length should be at least twice the second moment diameter of the beam, and the slit width shall be less than one twentieth of the second moment beam diameter.

A4. $M^2$ Measurement

Rules-of-Thumb and Sanity Checks $M^2$ is not a quantity that can be measured to the last fraction of a percent. An $M^2$ value accuracy of ±10% is often acceptable; ±5% is good, and better than ±5% is exceptional. What accuracies need to be achieved in the raw measurements in order to measure $M^2$ accurately?

A4.1 Accurately Measuring the Waist

From equation 4), and FIG. 1), it is apparent that in order to measure $2W_0$ accurately, a measurement must be made within a certain fractional distance ($z/z_R$) of the waist. For the fractional error in $2W_0$ to be less than 'g', the measurement must be made within a normalized distance from the waist given by (Ref.2):

$$\left(\frac{z}{z_R}\right) = \sqrt{2g} \qquad A11)$$

E.g. For g<±0.01 (1%), $(z/z_R) \leq \pm 0.14$ (14%). Therefore any measurement within $1/7^{th}$ of a Rayleigh range of the z=0 beamwaist position can in principle measure $2W_0$ to within ±1%.

A small table can be constructed:

| $2W_0$ Accuracy Sought | Allowable ($z/z_R$) error |
| --- | --- |
| ±1% | ±14% |
| ±2% | ±20% |
| ±5% | ±32% |
| ±10% | ±45% |

A4.2 Accurately Measuring Divergence and/or 2w(z) Versus z

Divergence $\Theta$ may be measured directly at large values of (z/zR). Referring to FIG. 1, at large z the diagonals defining $\Theta$ are asymptotic to the hyperbolic curve of 2W(z) versus z, and $\Theta$ could be calculated from 2W(z) as:

$$\Theta = 2 \cdot \arctan(W(z)/z) \qquad 8)$$

$$[ = (2W(z)/z) \text{ for small } \Theta ]$$

The error in this assumption may be calculated from equations 4) and 8) to be:

| Ξ Error from 2W(z) Error | $(z/z_R)$ value |
|---|---|
| <+1% | ≧5.7 |
| <+2% | ≧4.4 |
| <+5% | ≧3.0 |
| <+10% | ≧2.2 |

Since some of these $(z/z_R)$ values may be inconveniently large, $\Theta$ is not normally measured directly. Instead, $M^2$ is calculated by fitting the measurements of $2W(z)$ versus z to the hyperbolic curve of equation 6). Ref.2 shows that for maximum sensitivity to the fractional change versus z in the shape of the hyperbolic curve, it is preferable to work within the region:

$$0.5 < |z/z_R| < 2.0 \qquad A12)$$

Working at values of $|z/z_R| < 0.5$ compromises the accuracy of the measurements.

Working at values of $|z/z_R| > 2.0$ is not as big a problem, but leads to lower accuracy as the ratio increases. But unless $M^2$ is already known, how can you know $z_R$ and work within the $(z/z_R)$ regions indicated by the discussions above?

In Practice:

An approximate value of $M^2$ may be known and $z_R$ can then be estimated before setting up and starting the measurements.

$z_R$ can be calculated from the $M^2$ measurements. After the first run, the set-up can be assessed in order to verify that the $(z/z_R)$ region is in accord with condition A12).

A4.3 Inaccessible Beam Waists

If no accessible beam waist exists, then an ancillary lens must be used to form the waist. This is normally the case when the laser itself is being measured, since the beam waist is in the vicinity of the output mirror.

Figure 16:
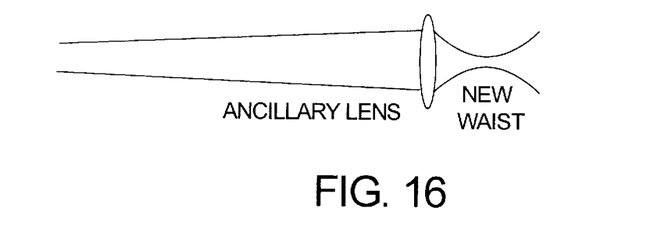
FIG. 16 illustrates the formation of a new waist using a lens, when the original waist is inaccessible.

See FIG 16.

The ancillary lens used to form the waist should be in the far-field of the laser, preferably $> z_R$ (i.e. $z_R$ for the laser source) from the limiting aperture or laser waist. ('Away from diffractive overlay from the mode selecting aperture of the laser', Ref. A2).

For a 'typical' HeNe, $2W_0 \approx 0.8$ mm, divergence $\Theta \approx 1$ mrad, $z_R = 2W/\Theta \approx 0.8$ m.

A4.4 Correct Waist Formation using a Lens

In order not to increase the $M^2$ of the original beam, this lens must be used within its aberration-free, diffraction-limited region of operation. For a plano-convex singlet, typically employed in these applications, spherical aberration is the dominant on-axis aberration. In order to keep this contribution well below (a factor of five below) the diffraction limit, it may be shown (Ref.3) that:

$$f\text{-number} \geq (137 f/\lambda)^{0.25} \qquad A13)$$

Where:
f mm is the focal length of the lens
$\lambda \mu$m is the laser wavelength
f-number is defined as f divided by the $1/e^2$ diameter of the beam at the lens For a 25 mm diameter, 75 mm focal length, plano-convex lens, this leads to:

| λ nm | f/# | Max. Beamwidth at Lens |
|---|---|---|
| 400 | >f/12.7 | 2.0 mm |
| 633 | >f/11.3 | 2.2 mm |
| 830 | >f/10.6 | 2.4 mm |
| 1064 | >f/9.9 | 2.5 mm |

(Due to the 0.25 power dependence in equation 10), even a wider tolerance, such as allowing the aberration contributions to be equal, only decreases the f/number to >f/7.6 at 633 nm for a maximum beamwidth of 3.3 mm. Ref. 2 conservatively recommends >f/20 in all circumstances.)

It is therefore important to perform such a calculation for the lens employed, and if necessary use a lens with either with lower aberrations or a longer focal length.

Typically, the choice to reduce spherical aberration would be either an achromat, which normally has significantly reduced spherical aberration, or a laser focussing singlet (see, for example, the Melles Griot catalog). A longer focal length plano-convex singlet may be a solution. [But only if the Rayleigh range can be kept low enough for the scan range if a scanning $M^2$ stage is employed. See, e.g., DataRay's BeamScope™ with its $M^2$ Accessory scan stage.]

A5. Beam Divergence

Beam divergence is the change in beam diameter versus distance along the propagation axis z. Far from the beamwaist at the beam origin or a beam focus, the divergence is essentially constant.

The simplest measurement is of beam diameter $2W(z_1)$ and $2W(z_2)$ at distances $z_1$ and $z_2$ along the propagation axis. The full angle angular divergence 'Alpha' is then calculated as:

$$\text{Alpha} = 2.\arctan[\{2W(z_2) - 2W(z_1)\}/\{2.(z_2 - z_1)\}]$$

Multiple measures of $2W(z)$ at various values of z improves the accuracy of the measurement.

A6. Acknowledgements

In parts, this Application Note draws on Reference 2, and we have used the same notation wherever possible.

A7. REFERENCES

A1. ISO 11146. "Optics and Optical Apparatus. Lasers and Laser Related Equipment. Test Methods for Beam Widths, Divergence Angle and Beam Propagation Factor." Published by the International Organization for Standardization.

A2. T. F. Johnston Jr., "Beam Propagation ($M^2$) Measurement Made as Easy as it Gets: the Four-Cuts Method", Applied Optics, Vol. 37, No. 21, Jul. 20, 1998, pp. 4840–4850.

A3. Anonymous; 'Fundamental Optics, Lens Selection, Example 4:'; Melles Griot 1997–98 Catalog Appendices. Equation 4 assumes equal contributions from diffraction and spherical aberration. This application note modifies that assumption to five times greater diffraction than spherical aberration.

We claim:

1. An apparatus for real-time measurement of parameters of an optical beam propagating along an axis transverse to a reference plane, the apparatus comprising:

an assembly having at least two non-circular apertures on a plane parallel to said reference plane, a means for moving said assembly such that said apertures sequentially intercept the optical beam along a scanning path transverse to the beam propagation axis, said non-circular apertures being disposed in different angular alignments relative to said scanning path, a means for detecting optical power of the beam transmitted through said non-circular apertures, and a processor means connected to said detecting means for calculating optical intensity of the beam transmitted through said non-circular apertures versus position of the non-circular apertures.

2. An apparatus in accordance with claim 1 further comprising:

a means for forming an output signal representative of the distance between the position of said reference plane and the position of the beam focus, and a means for altering relative position of said assembly and the beam focus in response to said output signal in a manner such as to reduce said distance.

3. An apparatus in accordance with claim 1 further comprising:

a clock, and a means for determining the position in space of said non-circular apertures as a function of time as measured by said clock, and wherein said processor has a first stage for producing an output signal in dependence on the power detected by said detecting means.

4. An apparatus in accordance with claim 3 wherein said output signal produced by said first stage of said processor means is in linear dependence on the optical power detected by said detecting means.

5. An apparatus in accordance with claim 3 wherein said output signal produced by said first stage of said processor means is in logarithmic dependence on the optical power detected by said detecting means.

6. An apparatus in accordance with claim 3 wherein said processor means has a second stage which receives the output signal generated by said first stage and includes an ADC (Analog to Digital Converter) for converting said output signal into a digital format.

7. An apparatus in accordance with claim 3 further comprising a processing means for computing a 2-D profile of the beam.

8. An apparatus in accordance with claim 1 wherein said assembly comprises:

a rotatable disk having a central axis and having said non-circular apertures formed therein, a means for supporting the rotatable disk so its central axis is offset from the axis of beam propagation and is substantially parallel thereto, a means for rotating the rotatable disk about its central axis, and a means for determining the rotational position of the rotatable disk as a function of time.

9. An apparatus in accordance with claim 8 wherein said means for rotating said rotatable disk comprises a damped micro-step driven, multi-phase stepper motor.

10. An apparatus in accordance with claim 9 further comprising:

a starting means for providing starting conditions that exceed normal operating conditions for starting said stepper motor after a period without rotation, and a control means for enacting multiple start attempts until said rotatable disk achieves a specified speed within a specified period of time.

11. An apparatus in accordance with claim 9 wherein the central axis of said rotatable disk is offset from the axis of beam propagation such that said non-circular apertures intercept the beam at a point more than one beam diameter away from said central axis.

12. An apparatus in accordance with claim 9 wherein said non-circular apertures are radially spaced from the central axis of the disk and are positioned within substantially equal ranges of radius values.

13. An apparatus in accordance with claim 9 further comprising a means for coarse referencing angular position of said rotatable disk once per revolution.

14. An apparatus in accordance with claim 13 further comprising a means for fine referencing the angular position of said rotatable disk once per revolution, wherein said means defines a "start of rotation" fine reference for the rotatable disk as being the next cardinal step of said stepper motor after the detection of said coarse reference.

15. An apparatus in accordance with claim 1 wherein said at least two non-circular apertures are a pair of slits disposed at different respective angles with respect to the scanning path.

16. An apparatus in accordance with claim 1 wherein said at least two non-circular apertures are a pair of knife-edges disposed at different respective angles with respect to the scanning path.

17. An apparatus in accordance with claim 1 wherein said at least two non-circular apertures are a pair of slits or knife-edges disposed at +45 degrees and −45 degrees with respect to the scanning path.

18. An apparatus in accordance with claim 1 wherein said means for detecting optical power is a photosensitive detector positioned relative to said assembly such that all power transmitted along the beam propagation axis through said non-circular apertures is intercepted by the detector.

19. An apparatus in accordance with claim 1 wherein said means for detecting optical power is an array of photosensitive detectors positioned relative to said assembly such that all power transmitted along the beam propagation axis through said non-circular apertures is intercepted by the array of detectors.

20. An apparatus in accordance with claim 1 wherein the assembly has at least three additional apertures, said additional apertures being non-circular and mutually identical and being disposed in identical angular alignments relative to said scanning path on respective planes that are parallel to the reference plane and are spaced from each other.

21. An apparatus in accordance with claim 20 further comprising a plurality of apertures of larger area than said additional apertures, said apertures of larger area being positioned on respective planes parallel with and spaced on either side from said reference plane.

22. An apparatus in accordance with claim 20 wherein said assembly comprises:

a rotatable disk having a central axis and having said non-circular apertures formed therein, a means for supporting the rotatable disk so its central axis is offset from the axis of beam propagation and is substantially parallel thereto, a means for rotating the rotatable disk about its central axis, and a means for determining the rotational position of the rotatable disk as a function of time.

23. An apparatus in accordance with claim 1 wherein the assembly has an additional aperture of sufficient dimension as to allow all beam power to pass through said additional aperture.

24. An apparatus for real-time measurement of parameters of an optical beam propagating along an axis transverse to a reference plane, the apparatus comprising:

an assembly having at least three identical non-circular apertures disposed on respective planes parallel to the reference plane and spaced from each other, a means for moving said assembly such that said non-circular apertures sequentially intercept the optical beam along a scanning path transverse to the beam propagation axis, said at least three identical non-circular apertures being disposed in identical angular alignments relative to said scanning path, a means for detecting optical power of the beam transmitted through said non-circular apertures, and a processor means connected to said detecting means for calculating optical intensity of the beam transmitted through said non-circular apertures versus position of the non-circular apertures.

25. An apparatus in accordance with claim 24 further comprising:

a means for forming an output signal representative of the distance between the position of said reference plane and the position of the beam focus, and a means for altering relative position of said assembly and the beam focus in response to said output signal in a manner such as to reduce said distance.

26. An apparatus in accordance with claim 24 further comprising:

a clock, and a means for determining the position in space of said non-circular apertures as a function of time as measured by said clock, and wherein said processor has a first stage for producing an output signal in dependence on the power detected by said detecting means.

27. An apparatus in accordance with claim 26 wherein said output signal produced by said first stage of said processor means is in linear dependence on the optical power detected by said detecting means.

28. An apparatus in accordance with claim 26 wherein said output signal produced by said first stage of said processor means is in logarithmic dependence on the optical power detected by said detecting means.

29. An apparatus in accordance with claim 26 wherein said processor means has a second stage which receives the output signal generated by said first stage and includes an ADC (Analog to Digital Converter) for converting said output signal to digital format.

30. An apparatus in accordance with claim 24 wherein said assembly comprises:

a rotatable disk having at central axis and having said non-circular apertures formed therein, a means for supporting the rotatable disk so its central axis is offset from the axis of beam propagation and is substantially parallel thereto, a means for rotating the rotatable disk about its central axis, and a means for determining the rotational position of the rotatable disk as a function of time.

31. An apparatus in accordance with claim 30 wherein the central axis of said rotatable disk is offset from the axis of beam propagation such that said non-circular apertures intercept the beam at a point more than one beam diameter away from said central axis.

32. An apparatus in accordance with claim 30 wherein said non-circular apertures are radially spaced from the central axis of the disk and are positioned within substantially equal ranges of radius values.

33. An apparatus in accordance with claim 24 wherein said means for detecting optical power is a photosensitive detector positioned relative to said assembly such that all power transmitted along the beam propagation axis through said non-circular apertures is intercepted by the detector.

34. An apparatus in accordance with claim 24 wherein said means for detecting optical power is an array of photosensitive detectors positioned relative to said assembly such that all power transmitted along the beam propagation axis through said non-circular apertures is intercepted by the array of detectors.

35. An apparatus in accordance with claim 24 wherein said means for rotating said rotatable disk comprises a damped micro-step driven, multi-phase stepper motor.

36. An apparatus in accordance with claim 35 further comprising:

a starting means for providing starting conditions that exceed normal operating conditions for starting said stepper motor after a period without rotation, and a control means for enacting multiple start attempts until said rotatable disk achieves a specified speed within a specified period of time.

37. An apparatus in accordance with claim 24 further comprising a means for coarse referencing angular position of said rotatable disk once per revolution.

38. An apparatus in accordance with claim 37 further comprising a means for fine referencing the angular position of said rotatable disk once per revolution, wherein said means defines a "start of rotation" fine reference for the rotatable disk as being the next cardinal step of said damped motor after the detection of said coarse reference.

39. An apparatus in accordance with claim 24 wherein the assembly has an additional aperture of sufficient dimension as to allow all beam power to pass through said additional aperture.

40. An apparatus in accordance with claim 24 further comprising a plurality of additional apertures having higher transmission values than said three identical non-circular apertures, said additional apertures positioned on a plane or plurality of planes co-parallel with and spaced on either side from said reference plane.

* * * * *